Patented Dec. 22, 1931

1,838,077

UNITED STATES PATENT OFFICE

MORTIMER T. HARVEY, OF EAST ORANGE, NEW JERSEY, ASSIGNOR TO THE HARVEL CORPORATION, OF NEWARK, NEW JERSEY, A CORPORATION OF NEW JERSEY

COMPOSITION FOR ELECTRICAL INSULATION AND OTHER PURPOSES AND METHOD AND STEPS OF MAKING AND USING THE SAME

No Drawing. Application filed June 20, 1929. Serial No. 372,521.

The present invention relates to electrical insulation and other products made from the liquid which occurs in the cellular spaces between the outer shell and the kernel of the cashew nut. The materials of the present invention are suitable to serve in places or for functions additional to or separate and distinct from their electrical insulating qualities, for example, to hold an electrical conductor in place against vibrations in an electrical machine, and the products of this invention are suitable for use as protective coatings and impregnations, for molded and mechanical parts having a degree of strength and for use in the arts generally.

Certain of the subject matter defined by some of the appended claims is useful for purposes other than electrical insulation or an ingredient of electrical insulation.

An object of the invention is to provide electrical insulation which has a higher dielectric value than insulation made from oils such as linseed oil and tung oils and the like.

Another object of the invention is to provide an electrical insulation which, when it is in place about a conductor, is insoluble in oils such as machine oil, castor oil, petroleums such as gasoline, kerosene, and so on.

Another object of the invention is to provide an electric insulation which has a high heat resistance.

Other objects and advantages of the invention will be apparent from the following specification and from the appended claims.

I have discovered that dried varnish films, impregnations, and molded compositions made of cashew nut shell liquid have a higher dielectric value than do insulations made of linseed oil, China wood oil and other materials heretofore known. I have also discovered that films, impregnations, and molded compositions made with cashew nut shell liquid, as hereinafter described for example, are insoluble in petroleum spirits and oils, are impervious to water and moisture, and can be successively and repeatedly heated to temperatures as high as 500° F. and higher, and cooled without lowering their dielectric value.

One method of making an insulation film according to the present invention is as follows. A quantity of cashew nut shell liquid is brought up to about 600° F. and cooled to room temperature. As the temperature is lowering an equal volume of solvent vehicle such as gasoline or varnoline is added at about 300° F. At room temperature, there is added a 40% water solution of formaldehyde in amount about one to five per cent by volume of the amount of cashew nut shell liquid used. The mixture is then heated to about 235° F. to drive off the water and then cooled. This solution can be thinned with more solvent vehicle if desired. Electrical coils or fabrics, paper, and so on dipped in or coated with this solution and heated at about 285° F. for about one hour will dry to a firm film which has the advantageous properties above set forth.

An air drying varnish is made as follows. Heat one volume of commercial cashew nut shell liquid to about 450° F. and add 2.5% to 5% of manganese resinate which dissolves therein and permit to cool to about 300° F. and add an equal volume of varnoline or gasoline, then cool to about 140° F. and add a 40% water solution of formaldehyde, in volume about 10% to 20% of the cashew nut shell liquid used, raise the temperature to about 190° F., preferably under a reflux condenser, and hold for about one to two hours, then raise to about 235°–240° F. to drive off water and any excess formaldehyde. Add another volume of solvent and cool. Dippings and coatings made of this will dry in air at room temperature in about five to eight hours.

A method of making a molded composition having electric insulating qualities and mechanical strength is as follows. A quantity of cashew nut shell liquid is mixed with a water solution of formaldehyde, the latter being about ten to fifteen per cent by weight of the cashew nut shell liquid, and heated to about 235°–240° F. to drive off water. The material is then cooled and mixed with a filler of fibrous or comminuted material and as a lead oxide, white, yellow or red, lime, barytes, asbestos, wood pulp and so on, and pressed to form in a mold and cured in an oven at about 285° F. for from one to four hours, according to the size of the mass, the resulting product being a hard, solid body which has good electrical insulating qualities, water and moisture resistance, resistance to deterioration by heating or by changes in temperature, and insolubility in petroleum oils and spirits, alcohol and so on. This material can be used without the filler, between layers of canvas, for example, where it is compressed and heated to set it at about 285° F. for about five to sixteen hours, depending on the mass of the assembly. Driers can be used with this cashew nut shell liquid and formaldehyde preparation, such as manganese resinate, copper oleate and the metal oxides above mentioned will serve as driers or accelerators to speed the setting. The manganese resinate when used can be about one-half to four per cent or more of the cashew nut shell liquid used.

As an example of steps in obtaining a liquid for dipping or coating the following is given. A quantity of the cashew nut shell liquid of commerce is brought up to a temperature of 600° F. and then permitted to cool. A mixture of one hundred parts by weight of this heat-treated cashew nut shell liquid and three parts of hexamine are raised to a temperature of about 265° F. and then allowed to cool. This latter temperature is suitable for small batches, for larger batches lower temperatures would need to be used depending on the rate of cooling after the heating. The reaction product is a liquid at normal temperatures. Dippings and coatings made of this liquid product when set at a temperature of 285° F. give a film which is water and moisture proof, is resistant to petroleum solvents, to acids and alkalis, and has a comparatively high dielectric value. This material, before setting, can be taken up and applied with a solvent such as gasoline, varnoline, benzol. The drying or setting time, when a solvent is used, is longer than when none is used.

When five parts by weight of hexamine are mixed with one hundred parts of cashew nut shell liquid, preheated as described in the preceding paragraph, and raised to a temperature of about 265° F., more or less to suit the volume of material used, a reaction product is obtained which will set to a film in about twenty minutes at about 285° F. This same material can be used as a coating on the marginal portions of sheet metal to serve as seals for seams in containers made up from the sheet metal. And the unset material can be formed into the annular channels in a common and well known form of metal cover for glass and other containers and set therein to a resilient, rubbery consistency by heating, for example, at about 200° F. for about two to three hours. This product will maintain its resiliency indefinitely and is resistant to the action of solvents and chemicals as named in the preceding paragraph.

An example of a method for making and applying an impregnating compound for electric coils is now given. Commercial cashew nut shell liquid is brought up to a temperature of about 600° F. and then permitted to cool, and as it cools, about one per cent of manganese resinate is added at 450° F. When the liquid reaches room temperature about three per cent of hexamine is added and the mixture is heated to 195° F. to dissolve the hexamine. Coils to be impregnated are heated for about two hours at about 225° F., and then placed in an autoclave and the air withdrawn therefrom, the suction being held for about one-half hour after maximum vacuum is obtained. The above prepared impregnating liquid is then charged into the autoclave without breaking the vacuum and the vacuum held for another half hour after charging with the impregnating liquid. From the time the liquid is charged into the autoclave the temperature therein is raised above room temperature to make the impregnating liquid thin but is kept below 160° F. so that said liquid does not set prematurely. The temperature used on a coil with paper between layers was kept around 125° F. At the end of the second half-hour period, that is one-half hour after the impregnating liquid is charged into the autoclave, the vacuum is released and pressure is applied of about 60 to 80 pounds for about one-half hour, to drive the liquid into the coils, the temperature being unchanged. At the end of this period the coils are removed from the autoclave, drained, and are baked in an oven at about 225° F. for about twelve hours to set the impregnating liquid. At the exposed surfaces the said liquid has a comparatively hard, smooth film, and inside the surface the impregnating liquid has set into a firm, binding mass. No solvent or vehicle was used for this impregnation, but when desired as in cases for dipping cloth or paper, for example, a vehicle can be used, petroleum spirits such as gasoline, varnoline and so on being suitable.

Another example for making coating, dipping, or impregnating material is now given. Two parts of commercial cashew nut shell liquid and one part of stearine pitch are mixed and heated together to about 600° F. and allowed to cool and as it cools hexamine, about two per cent of the whole, is added at 265° F., care being taken to cool the mass at a rate sufficient to retard setting reaction. With different size batches, the hexamine is added at different temperature to suit the rate at which the mass can be cooled. A vehicle, varnoline, is added at about 140° F.

Coatings of this material on paper and cloth dry to a smooth, flexible, and strong film in twenty minutes at about 265° F. For some purposes, such as for impregnations, the vehicle is omitted; and the hexamine is not added until the cashew nut shell liquid stearine pitch mixture has reached a lower temperature than that given above, for example, at 195° F., this for the purpose of slowing down or delaying the setting of the material and keeping it at an optimum state of fluidity until it has been forced into the material and structure to be impregnated.

Electrical insulation is made also by heating the cashew nut shell liquid to change it from its natural non-drying to the drying state, and it is used with or without driers or accelerators. This change from the non-drying to the drying state by heating is described in my copending applications Serial No. 37,865, filed June 17, 1925; and Serial No. 234,027, filed November 17, 1927, to which reference is hereby made, and the range of heating temperatures goes from about 200° F. upward through 600° F. to 700° F. and above. The driers or accelerators suitable are any one or any number of those hereinbefore and hereinafter mentioned and they can be added to the cashew nut shell liquid before, during or after the heating process. Among the driers mentioned herein are manganese resinate, copper oleate, and the several lead compounds, white, yellow and red lead.

A particular example of the making of electrical insulation of the present invention is as follows: a quantity of the cashew nut shell liquid is heated to about 600° F. and then allowed to cool, and drier is added consisting of litharge and manganese resinate, each in amount about 1% of the weight of the cashew nut shell liquid used. The drier can be added at any time, 450° F. being found to be practical for handling the materials. The prepared composition can be applied as it is, either at room temperature or at higher temperature, and it can be applied with a suitable solvent vehicle such as varnoline or gasoline; and the composition, however applied, is suitable for use for electrical insulation in many ways such as a coating or varnish; as an impregnation; for making molded compositions, either by itself without fillers or with fillers such, for example, as those hereinbefore named; as an insulating binder or cement; and in other ways. The composition above described can be set or dried in a film on paper or cambric at about 285° F. in about one-half hour, and in impregnations and molded compositions in about one-half hour to one hour at the above given temperature.

Also, insulation can be made on copper conductors by dipping the latter in either raw or heat treated cashew nut shell liquid, or otherwise obtaining a coating of said liquid on the copper, and heating to set the liquid or modification thereof in place, a suitable temperature being about 280° F.

The raw or modified cashew nut shell liquid can be applied and set on copper conductors which have a covering of cotton or other material thereon, and set in place by the aid of heat. In either case, that is when the raw or heat modified liquid is applied to bare conductor and also when applied to fabric covered conductor, the copper of the conductor serves in the nature of a catalyst to aid in the setting of the liquid to a dry, resin-like solid which has electrically insulating and heat and solvent resistant qualities. This action of copper is disclosed in my copending application Serial No. 127,709, filed August 6, 1926.

The cashew nut shell liquid can be used with natural drying oils such as linseed oil, or China wood oil; with gums or resins such as coumerone, copal, East India gum; with pitches, mineral, animal or vegetable; or with any number of said materials, to make insulation. An example of such follows: Three and one-half parts of cashew nut shell liquid and one-half part of linseed oil are heated to about 600° F., when this temperature is reached heating is discontinued and cold linseed oil, one-half part, is added; as the mix reaches about 550° F., in cooling, one per cent of litharge is added as a drier and the mix held at this temperture for about fifteen minutes, whereupon it is allowed to cool further to about 450° F., and one per cent of manganese resinate is added. In making coating material, an equal volume of varnoline solvent can be added to the mix at about 300° F. This preparation, with or without the solvent is useful in making electrical insulation coatings, dippings, impregnations, and molded compositions. In making molded compositions the preparations can be provided with fillers such as wood pulp, slate dust, barytes, asbestos, zinc oxide, Portland cement, lime and so on. The preparation will dry or set at about 285° F., and at higher and at lower temperatures. In the last above example, China wood oil can be used to replace all or part of the linseed oil; also fish oil, resins, gums, pitches, or waxes, can be added or substituted, such as copal or the others mentioned particularly elsewhere herein; also a mixture of China wood oil and copal in equal quantities can be used to replace the linseed oil; also linseed, China wood oil and the copal can be used in equal amounts in place of the straight linseed oil used. Also many other variations of mixtures of the materials named can be used both in proportions to and in kind with the cashew nut shell liquid.

In any of the above examples where raw or heat treated cashew nut shell oil is used; and with or without natural drying oils, waxes, pitches, gums or resins; formaldehyde, paraform, or the hexamethylenetetramine can be used to aid in setting the product, quantities suitable being about one to ten per cent, or more or less, and preferably added at about 100° F. to 115° F., a suitable setting temperature being about 285° F.

The above examples are given merely as such and are not to be considered as limiting the use and application of the methods and products of the invention because variations in percentages of the materials used, in the time and temperatures of the different heating steps and in the sequences these steps, and in the mode of application and use of the products of reaction can be made by one skilled in the art to suit different needs.

The products of the invention generally, are useful in making both hot and cold molded compositions, particularly in the solid state, which latter is obtained by increasing the length of time and/or temperature of one or more of the heating steps or otherwise varying the heating to suit different needs. Fillers can be mixed with the products of the invention in a liquid state or in a plastic state preparatory to forming molded compositions; also a primary solid or presolid product can be comminuted and mixed with a filled or filler and binder, such as product in the liquid or plastic state or other binder, and the material pressed and heated to complete the reaction for producing a final solid product.

In any or all of the products of the invention, such as those hereinbefore cited, driers and/or accelerators can be used to speed up the rate of setting. Such materials can be litharge, red lead, copper oleate, manganese resinate, and particularly in the advanced stages of the product, such as in molded compositions, lime, barytes and so on can be used both as filler and accelerator. Sulphur also can be used in the various products of the invention to react with the cashew nut shell liquid and to modify the reaction products.

Certain features of the present invention are set forth and claimed in my copending applications Serial No. 322,575, filed November 28, 1928 and Serial No. 341,271, filed February 19, 1929.

As to certain features claimed in the present application, the present application constitutes a continuation of my co-pending application Ser. No. 227,862 filed October 21, 1927, which application in turn as to certain features constitute a continuation of the subject matter disclosed and not specifically claimed in my Patent No. 1,725,794, dated August 27, 1929. As to other features claimed in the present application, the present application constitutes a continuation in part of my application Serial No. 37,865, filed June 17, 1925 (now Patent No. 1,725,791, dated August 27, 1929).

What I claim is:

1. Electrical insulation comprising a dried reaction product of cashew nut shell liquid.
2. Electrical insulation comprising cashew nut shell liquid which has been thickened through chemical action to a dry state.
3. Electrical insulation comprising cashew nut shell liquid which has been thickened through chemical action.
4. Electrical insulation comprising material which is a chemical reaction product of cashew nut shell liquid and a thickening agent.
5. Electrical insulation comprising material which is a chemical reaction product of cashew nut shell liquid and formaldehyde.
6. Electrical insulation, for use with metallic conductors, comprising a chemical reaction product of cashew nut shell liquid and a thickening agent.
7. Electrical insulation which is a chemical reaction product of cashew nut shell liquid, is dry, and is insoluble in petroleum spirits and oils.
8. Electrical insulation which is a chemical reaction product of cashew nut shell liquid, is dry, and is insoluble in petroleum spirits and oils, and whose dielectric value does not decrease after successive heating up to 500° F. and cooling.
9. Electrical insulating material comprising fibrous material and modified cashew nut shell liquid.
10. Electrical insulating material in a solid condition and including modified cashew nut shell liquid.
11. A material for mechanically supporting and electrically insulating electrical conductors subject to vibration, said material including modified cashew nut shell liquid.
12. Electrical insulation comprising fibrous material and a binder containing modified cashew nut shell liquid.
13. The method of improving the breakdown potential of electrical insulating material which comprises applying modified cashew nut shell liquid thereto.
14. The method of improving the breakdown potential of electrical insulating material which comprises impregnating modified cashew nut shell liquid thereinto.
15. The method of making electrical insulation which comprises modifying raw cashew nut shell oil and incorporating with a suitable carrier.
16. An electrical insulating material which includes as one constituent of the dielectric material cashew nut shell oil in a modified state.
17. The method of making electrical insulation which comprises first modifying raw cashew nut shell oil, thereafter incorporating said modified oil with a carrier, and thereafter setting and hardening the modified cashew nut shell oil.

18. The process which consists in heating linseed oil and cashew shell oil in contact with copper to produce a product which will dry.

19. A composition of matter comprising a mixture of cooked linseed oil and a product obtained by heating cashew nut shell liquid in contact with copper.

20. A composition of matter comprising a mixture of material of the group consisting of oils, resins and gums and a product obtained by heating cashew nut shell liquid in contact with copper.

21. Electrical insulation material obtained by heating cashew nut shell liquid in contact with copper.

22. Electrical insulation material obtained by heating cashew nut shell liquid in contact with a metalliferous drying characteristic imparting agent.

23. A composition of matter resulting from a mixture of material selected from the group consisting of drying oils and resins and a product obtained by heating cashew nut shell oil in contact with a metalliferous drying characteristic imparting agent.

24. A composition of matter comprising a mixture of modified cashew nut shell liquid and material selected from the group consisting of natural drying oils, and resins.

25. In the process of preparing cashew nut shell liquid for use, the steps including heating said liquid to change the same from the natural non-drying to a drying condition and incorporating therewith material selected from the group consisting of natural drying oils, gums, resins, pitches and waxes.

26. In the process of preparing cashew nut shell liquid for use, the steps including heating said liquid to above 400° F. to change the same from the natural non-drying to a drying condition and incorporating therewith material selected from the group consisting of natural drying oils, gums, resins, pitches and waxes.

27. In the process of preparing cashew nut shell liquid for use, the steps including heating said liquid to change the same from the natural non-drying to a drying condition and incorporating therewith material selected from the group consisting of natural drying oils, gums, resins, pitches and waxes, and a drier.

28. Molded composition comprising cashew nut shell liquid which has been modified to an infusible state.

29. A composition of matter comprising a mixture of modified cashew nut shell liquid and material selected from the group consisting of gums, pitches and waxes.

MORTIMER T. HARVEY.